ered to be part of the description of the invention.

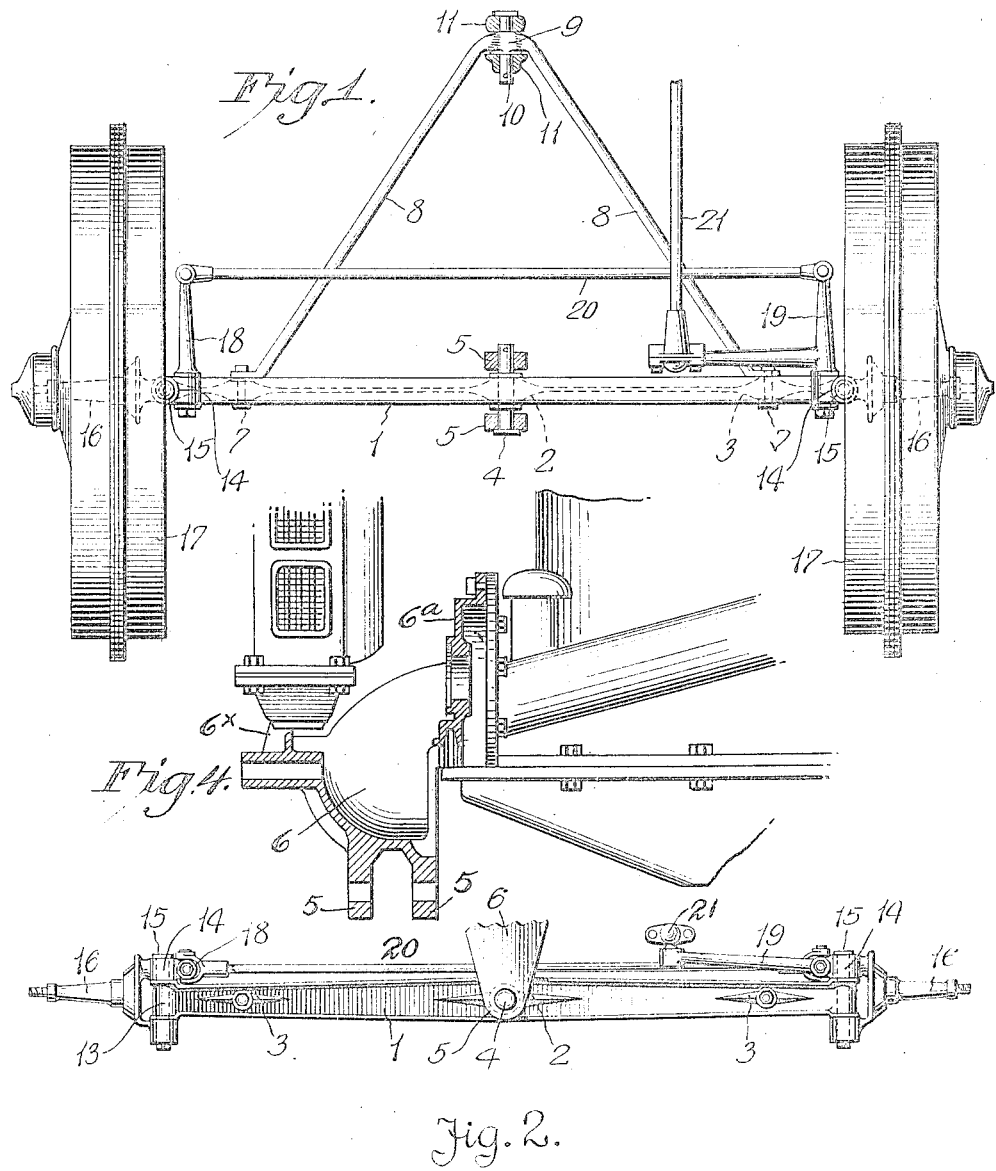

UNITED STATES PATENT OFFICE.

HENRY FORD, OF DEARBORN, MICHIGAN.

FRONT-AXLE ASSEMBLY.

1,377,674.   Specification of Letters Patent.   Patented May 10, 1921.

Application filed April 15, 1918. Serial No. 228,590.

*To all whom it may concern:*

Be it known that I, HENRY FORD, a citizen of the United States of America, residing at Dearborn, in the county of Wayne and State of Michigan, have invented certain new and useful Improvements in Front-Axle Assemblies, of which the following is a specification, reference being had therein to the accompanying drawings.

This invention relates to a front axle assembly for tractors, and my invention aims to furnish a tractor or other vehicle with a trunnioned axle of novel construction possessing rigidity and strength so essential in the operation of a tractor or vehicle body.

My invention will be hereinafter specifically described and then claimed and reference will be had to the drawings wherein Figure 1 is a plan of the axle assembly;

Fig. 2 is a front elevation of the axle;

Fig. 4 is a longitudinal section of a unitary radiator support and front cover adapted to be supported by the axle.

Figure 3:
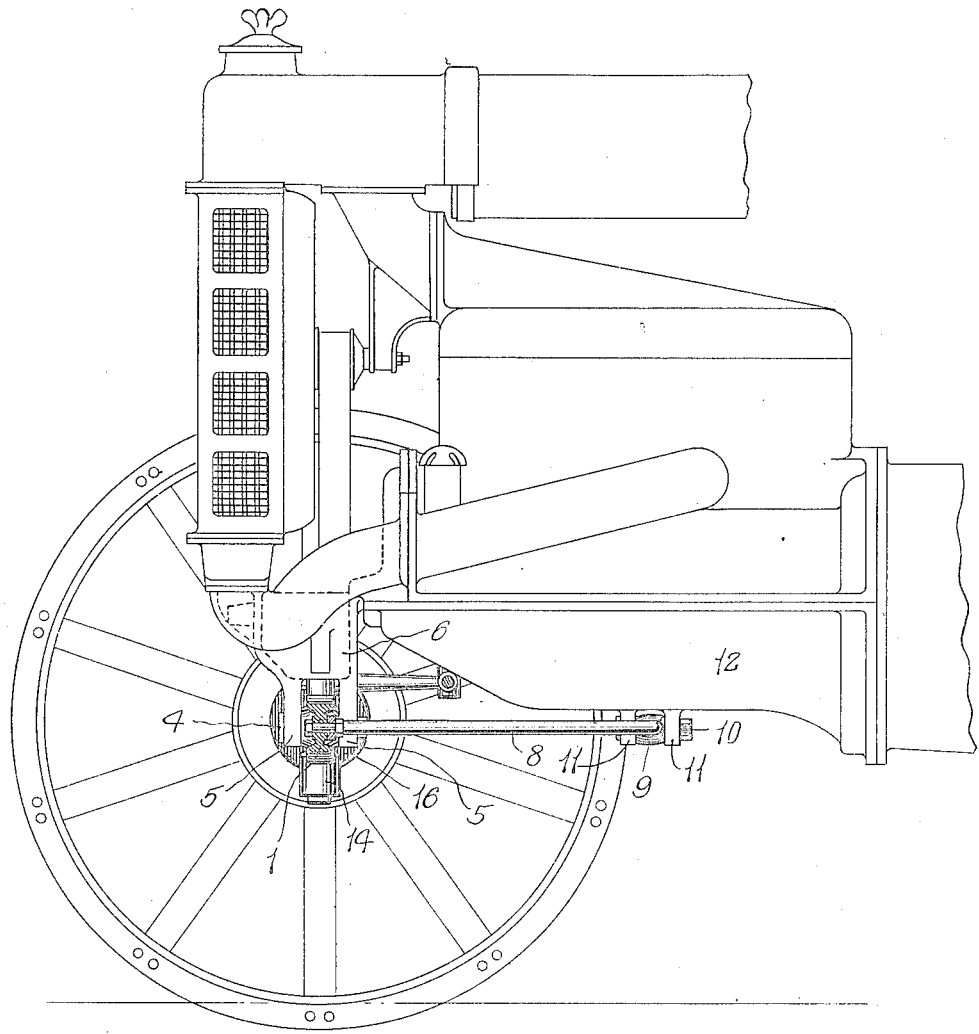
Fig. 3 is a sectional view of the same, showing the front axle in connection with a portion of a tractor.

The front axle assembly as now in use includes an axle 1 which is somewhat of the I-beam construction. The web of the axle, intermediate its ends and also in proximity thereto, is provided with thickened or enlarged portions 2 and 3 and these enlargements are provided with transverse openings. In the opening of the enlargement 2 is a trunnion 4 and this trunnion supports a bifurcated lower end 5 of a cylinder front cover 6 said cover forming part of the power plant of a tractor, as best shown in Figs. 3 and 4. The front cover 6 has a vertical portion 6ª in the rear of the vertical plane of the axle supporting the forward end of the power plant, and a horizontal portion 6ˣ in front of the vertical plane of the axle supporting the radiator.

In the openings of the enlargements 3 are fastening means 7 for the ends of a radius rod 8, said rod being angular in form with an enlarged portion 9 at its vortex and this enlarged portion is loose on a pin 10 mounted on a depending apertured lug 11, carried by a crank case 12 forming part of the power plant of the tractor.

The axle 1 and its radius rod are therefore tiltable about the axis of the longitudinally alining pin 10 and trunnion 4, and this is essential in order that the front axle may assume various angles relative to the ground during the operation of the tractor. At the ends of the axle are bearings 13 for the knuckles 14 and pins 15 of front wheel spindles 16, these spindles being provided with tractor wheels 17.

The front wheel spindles have left and right steering arms 18 and 19 coupled by a connecting rod 20, and connected to the right steering arm 19 in the usual and well known manner is a steering drag link 21.

I attach considerable importance to the manner in which the tiltable or trunnioned axle is braced relative to the power plant of the tractor, as the front axle is always maintained at a right angle to the longitudinal axis of the tractor, yet possessing a tilting action which is essential when irregular ground is encountered.

What I claim is:—

1. In a front axle assembly, the combination with the power plant of a tractor, of a front axle set in a vertical plane in front of the power plant and having a central portion trunnioned to and supporting the front end of the power plant, radius rods in the same horizontal plane as said axle and connected to said axle and trunnioned relative to said power plant, and steerable wheels at the ends of said axle.

2. In a front axle assembly, the combination of a power plant having a crank case and a front cover, a front axle in a plane in front of the power plant trunnioned relative to and supporting the tractor power plant solely through the cylinder front cover of the power plant, a radius rod having its ends connected to said axle, and intermediate portions thereof trunnioned to the crank case of said power plant, and wheels at the ends of said axle.

3. In a front axle assembly, the combination of a tractor power plant having a crank case and a cylinder front cover, an axle connected to the cylinder front cover of the power plant and having a tilting action relative thereto, wheels at the ends of said axle, and means wholly in the same horizontal plane as said axle and connecting the ends of said axle to the crank case of the tractor power plant.

4. In a tractor, a power plant having a radiator, an axle in advance of said power plant provided with wheels, and a unitary radiator support and front cover for said power plant having a downwardly extending portion connected to the axle.

5. A tractor as characterized in claim 4, wherein additional rearwardly extending means in the same plane as said axle connects said axle to the bottom of the power plant.

6. In a tractor, the combination of an axle having wheels, a power plant for the tractor, a radiator forming part of a cooling system for the power plant, and an element supported by said axle and having a vertical portion in the rear of the vertical plane of the axle supporting the forward end of the power plant, and a horizontal portion in front of the vertical plane of the axle supporting said radiator.

In testimony whereof I affix my signature in the presence of two witnesses.

HENRY FORD.

Witnesses:
ROBERT E. WALTER,
E. G. SIEBOLD.